United States Patent [19]

Gaworowski et al.

[11] Patent Number: 5,795,536
[45] Date of Patent: Aug. 18, 1998

[54] METHOD AND APPARATUS FOR CURING CYLINDRICAL POLYMERIC OBJECTS

[75] Inventors: Andrew J. Gaworowski; Darren E. Hercyk, both of Spartanburg; Roger D. Meadows, Moore; Herman D. Sheron, Jr., Seneca, all of S.C.

[73] Assignee: Reeves Brothers, Inc., Spartanburg, S.C.

[21] Appl. No.: 598,875

[22] Filed: Feb. 9, 1996

[51] Int. Cl.⁶ .................................................. B29C 35/04
[52] U.S. Cl. .......................... 264/571; 264/314; 425/388; 425/389
[58] Field of Search ................................ 264/512, 570, 264/313, 516, 257, 258, 314, 137; 425/34.2, 34.3, 389, 390, 393, 40, 39, 388

[56] References Cited

U.S. PATENT DOCUMENTS

| | | | |
|---|---|---|---|
| 1,390,375 | 9/1921 | Offenhauser | 425/34.2 |
| 1,665,310 | 4/1928 | Laursen | 264/570 |
| 3,962,394 | 6/1976 | Hall | 264/90 |
| 4,027,543 | 6/1977 | Johnston | 264/570 |
| 4,308,225 | 12/1981 | Magarian | 264/257 |
| 4,489,030 | 12/1984 | Brooks | 264/313 |
| 4,554,040 | 11/1985 | van der Velden | 156/215 |
| 5,051,226 | 9/1991 | Brustad et al. | 264/570 |
| 5,186,951 | 2/1993 | Siegenhaler | 425/40 |
| 5,304,267 | 4/1994 | Vrotacoe et al. | 156/86 |
| 5,316,798 | 5/1994 | Tittgemeyer | 427/409 |
| 5,323,702 | 6/1994 | Vrotacoe et al. | 101/217 |
| 5,468,140 | 11/1995 | Hoffman et al. | 264/314 |

Primary Examiner—Catherine Timm
Attorney, Agent, or Firm—Pennie & Edmond LLP

[57] ABSTRACT

The present invention provides a method and apparatus for the rapid, uniform curing of cylindrical, polymeric objects. The invention provides precise, accurate control of both the curing temperature and pressure because the heating system is independent of the pressurization device. Cylindrical polymeric objects are cured by mounting the object on a cylindrical mandrel, applying substantially uniform pressure to the outer surface of the object, typically through an expandable bladder, and supplying curing is heat directly to the object by circulating a liquid heat transfer medium through the bladder or mandrel. Preferably, the expandable elastomeric bladder is mounted coaxially with the mandrel, and is expanded with a suitable liquid or gas to provide the pressure. The liquid heat transfer medium can be pumped through a passage in the mandrel to apply heat directly to the interior of the object, or the liquid heat transfer medium may be used to expand the bladder and apply the curing heat to the exterior of the object. Alternatively, a combination of both techniques may be employed.

19 Claims, 8 Drawing Sheets

METHOD AND APPARATUS FOR CURING CYLINDRICAL POLYMERIC OBJECTS

FIELD OF THE INVENTION

This invention relates to a method and apparatus for the rapid, uniform curing of cylindrical polymeric objects, and, in particular, to a method and apparatus for the rapid, uniform curing of compressible cylindrical printing blankets for use in offset printing presses.

BACKGROUND OF THE INVENTION

Figure 1:
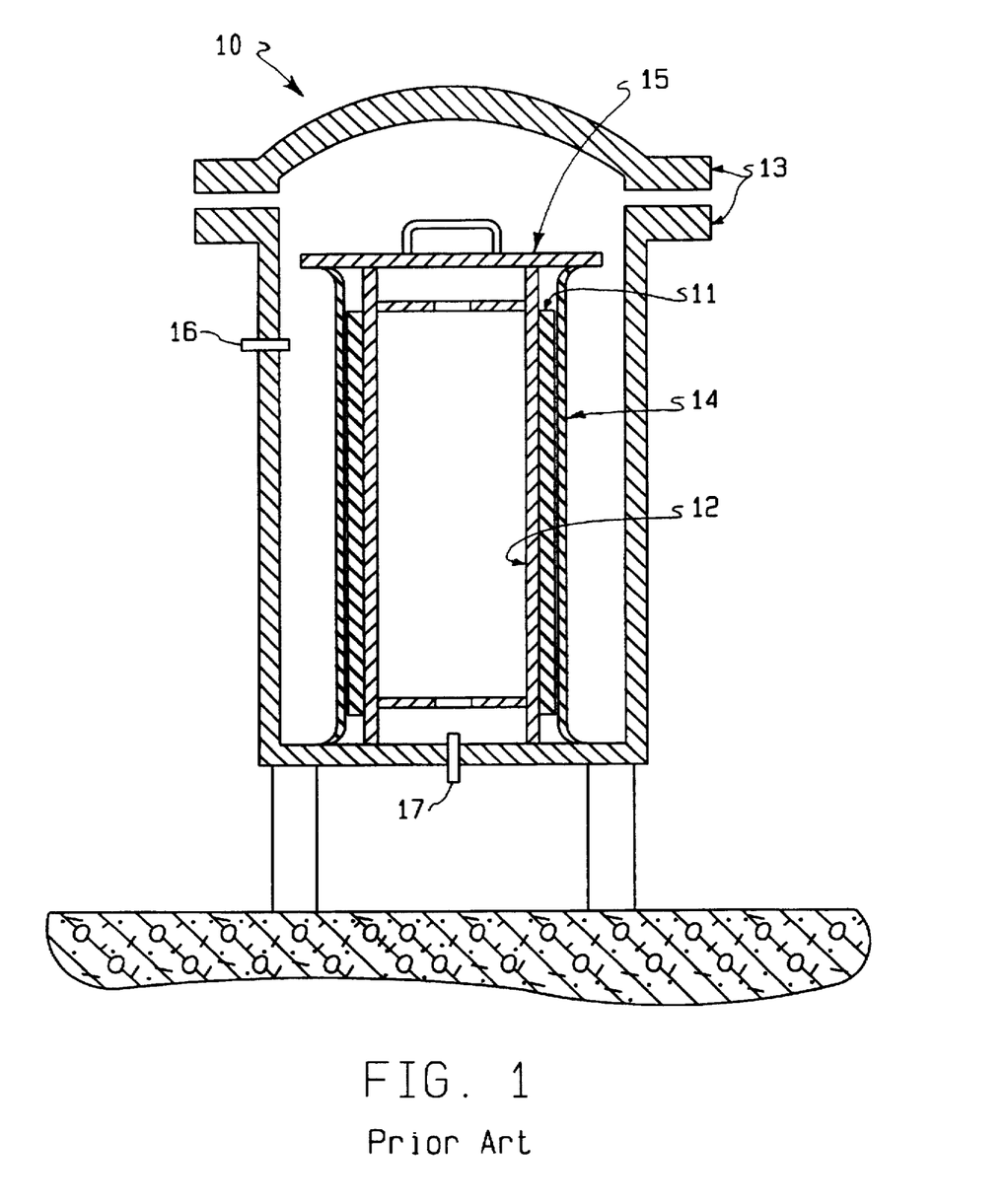
FIG. 1 depicts a prior art vulcanizer for curing reinforced rubber sleeves.

Fast curing of reinforced rubber sleeves is generally known in the manufacture of v-belts and timing belts. A typical vulcanizer, of the type known in the art for curing rubber sleeves is shown in FIG. 1. In the vulcanizer, 10, an uncured rubber cylinder, 11, is placed or formed on the outer surface of a hollow cylindrical mold or mandrel, 12, inside a steam-heated autoclave, 13. A flexible, cylindrical bladder, 14, which is typically formed from an elastomeric material, is mounted coaxially with the mandrel, 12, around cylinder, 11, and extends from a seal plate, 15, positioned above the mandrel, 14, to the bottom of the autoclave, 13. Mounting the bladder in this manner isolates the uncured rubber cylinder, 11, from the interior of the autoclave, 13. High pressure steam is introduced into the interior of the sealed autoclave, 13, through at least one high pressure steam port, 16, to compress the bladder, 14, onto the surface of the uncured rubber cylinder, 11. The high pressure steam serves two purposes: first, it provides heat for curing the rubber, and, second, it provides the pressure required to ensure that the final product is not porous, and has the desired cylindrical form. Additional curing heat is provided by injecting low pressure steam into the interior of the mandrel, 12, through a low pressure steam port, 17.

The control of the pressure of the live steam used to supply heat and pressure is imprecise at best. As the pressure and temperature of a gas are directly related for a fixed volume, the pressure and the temperature of the steam cannot be adjusted independently. Therefore, this method is not suitable for objects that require porous or compressible rubber, as such objects will be deformed by the steam pressure at the required temperature. The high pressure reduces the porosity of the object, which reduces the compressibility of the product.

In particular, this method is not suited for cylindrical printing blankets, which must be compressible to ensure clear printing. An additional disadvantage of the prior art method is the heavy pressurized autoclave that is required as the vulcanizer. Such a device is expensive, cumbersome, and difficult to operate, as assembly and disassembly for the production of each production unit is time consuming. In addition, the use of live steam is dangerous, and requires excessive amounts of time for heating and cooling during the curing process, which reduces the efficiency of the apparatus.

U.S. Pat. Nos. 5,304,267 and 5,323,702 disclose a curing method for the production of rubber covered rolls. As disclosed in the subject references, the external pressure on the curing rubber is provided by means of a flexible nylon tape crosswrap, which is wrapped tightly on the rubber covering of the roller. Wrapped rollers are typically vulcanized in hot air ovens which provide for a slow heat transfer to the rubber. This type of curing does not provide for the precise control of pressure, and, thus, it is not possible to obtain uniform pressure on the surface of the uncured rubber. In addition, as the entire roller assembly must be heated to vulcanize the rubber, the curing process requires an excessive amount of time. For example, the '702 patent discloses curing a blanket wrapped with 2.25 inch nylon tape for 4 hours at 200° F. and for 4 hours at 292° F.

U.S. Pat. No. 3,962,364 discloses a method of producing a fiber reinforced composite tube. A liquid resin impregnated layer of reinforcing fibers is applied to a cylindrical mold or mandrel. A compression sleeve, which is split lengthwise to permit circumferential contraction or expansion is placed in contact with the exposed surface of the fiber resin layer. The mandrel, the fiber resin layer, and the compression sleeve are then sealed in a plastic bag or bladder, which is evacuated to produce pressure on the compression sleeve, and, in turn, on the fiber resin layer.

Finally, the sealed and evacuated assembly is placed in an oven or autoclave to cure the resin. As with the disclosures of U.S. Pat. Nos. 5,304,267 and 5,323,702, the entire roller assembly must be heated to vulcanize the rubber, and the curing process requires excessive amounts of time.

The prior art fails to provide precise and accurate independent control of the temperature and pressure in the rapid curing of cylindrical polymeric objects. Moreover, the prior art requires excessive amounts of time for heating and cooling, making the prior art methods highly inefficient.

Therefore, a continuing need exists for a method and apparatus for the rapid curing of cylindrical polymeric objects that provides precise and accurate control of the temperature and pressure of the curing process, and provides for rapid heating and cooling for efficient use of the apparatus. The present invention provides one solution to this problem.

SUMMARY OF THE INVENTION

The present invention provides a method and apparatus for the rapid, uniform curing of cylindrical, polymeric objects. The invention provides precise, accurate control of both the curing temperature and pressure because the applied pressure is independent of the temperature of the heating means.

The method of the invention comprises rapidly curing an uncured cylindrical object by supporting the object between first and second support surfaces, which contact the outer and inner surfaces of the object, respectively, and heating at least one of the support surfaces to directly transfer heat to substantially all of the object. Typically, the heat is provided by contacting at least one of the support surfaces with a heated liquid heat transfer medium. To facilitate removal of the cured object from the support surfaces after curing, one of the support surfaces may be cooled by contact with a cooled heat transfer medium following the heating step.

The object is typically supported by providing a stationary support, and placing the object in coaxial orientation about the stationary support. One support surface is then expanded between a first position, where it is spaced from the object, to a second position, where it contacts and supports the object. If the expandable support surface is heated by contact with a heated liquid heat transfer medium, the heated medium can also be utilized to expand the expandable support, whereby contact between the support surface of the expandable support and the object transfers heat to cure the object.

In an alternative embodiment, a pressurized gas is circulated into and out of the expandable support to respectively expand and contract the support surface. The support surface of the expandable support may also be assisted in contacting the object by providing a vacuum in the space between the expandable support and object.

The apparatus of the invention includes a cylindrical mandrel having an outer surface and an expandable bladder, which is mounted coaxially around the outer surface of the mandrel with an inner surface that is initially spaced from the outer surface of the mandrel. The bladder is configured and adapted for applying substantially uniform pressure to a cylindrical object positioned on the outer surface of the mandrel. In addition, the apparatus includes a liquid heat transfer medium for providing heat to the mandrel or bladder for direct transfer of heat to the object for curing. At least one passage may be provided in the mandrel for circulation of the heat transfer medium by a pump.

Reservoir means may be provided for the heat transfer medium, which is typically heated in the reservoir means. The reservoir means may also be configured with at least two compartments for storing the liquid heat transfer medium. In such an application, at least one compartment is adapted for heating the liquid heat transfer medium, and at least one other compartment is adapted for cooling the liquid heat transfer medium.

Typically, the bladder expands to apply pressure to the object by receiving a pressurized gas, which is admitted into and out of the bladder to respectively expand and contract the bladder. The bladder may also expand to apply pressure on the object by receiving the liquid heat transfer medium, which is circulated into and out of the bladder to respectively expand and contract the bladder. In an alternative embodiment, the apparatus includes at least one vacuum seal adapted to seal the space between the mandrel and the expandable bladder, and means for producing a vacuum in the space between the mandrel and the expandable bladder to assure contact of the inner surface of the bladder with the object.

The apparatus may also include at least one gas jet in the mandrel, adapted to direct a flow of gas to expand a sleeve to facilitate installation and removal of the cylindrical object, and means for providing pressurized gas to the at least one gas jet.

DETAILED DESCRIPTION OF THE INVENTION

The present invention relates to a method and apparatus for the rapid curing of cylindrical polymeric objects with improved levels of control of the temperature and pressure, and which allows the temperature and pressure to be independently controlled. Heat for curing is provided by a liquid heat transfer medium, which, typically, is heated in a reservoir by a conventional heat source, and pumped through the curing apparatus with a recirculating pump. A constant flow of the liquid heat transfer medium, maintained at a substantially constant temperature, will heat the curing apparatus at a predictable rate, and will maintain the temperature of the curing apparatus at a precise value, once a desired temperature is obtained.

Cylindrical polymeric objects cured in accordance with the present invention can be composed of any material that requires heat curing. In particular the objects are those that require curing at vulcanization temperatures, such as uncured polymeric or elastomeric materials, including those typically used in cylindrical printing blankets and rubber sleeves for the manufacture of v-belts and timing belts. The cylindrical object may be composed of a single polymeric material, either in a single layer or in the form of a laminate. Alternatively, the object can be composed of two or more polymeric materials, either as a blend or in layers. Whatever polymeric material is used, the object may additionally contain reinforcing material, such as thread, yarn, fibers, or fabric. In the case of a laminate, the entire object may be cured in a single cure cycle, or the inner layers may be at least partially cured before the outer layers are incorporated into the object.

The apparatus for curing the cylindrical polymeric objects comprises a cylindrical mandrel, on which an uncured cylindrical, polymeric object is mounted for curing, a liquid heat transfer medium that is used to heat and, optionally, cool the apparatus and the object, and means for applying substantially uniform pressure on the outer surface of the object. The mandrel may be produced from any suitable material that is compatible with the temperature and pressure conditions that are required for curing. Suitable materials include metals and composites and the like. Preferably, the mandrel is formed of a metal, such as steel or copper coated aluminum.

Preferably, the means for applying substantially uniform pressure is an expandable elastomeric bladder, which is mounted coaxially around the mandrel, leaving a space between the bladder and the mandrel for mounting the object. The bladder may be expanded with any suitable liquid or gas to apply the desired substantially uniform pressure on the outer surface of the object. However, any means of applying substantially uniform pressure on the outer surface of the object may be utilized if the substantially uniform pressure applied is substantially independent of the curing temperature.

Heat is transferred to and, optionally, from the object by means of a liquid heat transfer medium, which is typically heated in a reservoir and pumped to and through either the mandrel, the means used to apply substantially uniform pressure, or both, to provide heat for curing the object. Preferably, the liquid heat transfer medium can also be cooled to remove heat from the apparatus, and to cool the curing apparatus rapidly. The liquid heat transfer medium may also be used to expand the bladder, and, thus, to apply the substantially uniform pressure.

The invention further comprises a method that provides for the rapid curing of cylindrical, polymeric objects with precise, accurate control of the curing temperature and pressure. The claimed method of curing comprises mounting an uncured cylindrical, polymeric object onto a mandrel, applying substantially uniform pressure to the outside of the object, pumping a liquid heat transfer medium through either the mandrel, the means used to apply substantially uniform pressure, or both, to heat and cure the object, removing the cured object from the mandrel, and preparing the mandrel for the mounting and curing of another object.

In one embodiment, an expandable elastomeric bladder, positioned around the object coaxially with the mandrel, is expanded with air or an inert gas, such as nitrogen, to apply substantially uniform pressure on the outer surface of the object, and the mandrel is heated to cure the object. In an alternate embodiment, the bladder is expanded with the liquid heat transfer medium, applying heat to the outer surface of the object. Both embodiments provide for the independent control of the pressure applied by the expandable bladder, allowing the precise, accurate control of both the curing temperature and pressure. However, any suitable means of applying substantially uniform pressure on the surface of the object may be utilized with the invention.

The liquid-heat transfer medium, which may be water, a glycol, an oil, or other suitable liquid, may be pumped through an internal passage in the body of the mandrel, heating or cooling the mandrel directly. This allows heat to be applied to the interior of the object for curing, and provides for the rapid cooling of the cured object for efficient use of the apparatus. If the liquid heat transfer medium is used to expand the bladder, heating and cooling can be provided directly to the outer surface of the object. Various embodiments of the invention provide for internal heating of the object, external heating, or the simultaneous heating of both the interior and exterior of the object.

The liquid heat transfer medium is typically heated and, optionally, cooled, in at least one reservoir in fluid communication with the curing apparatus, and pumped with a recirculating pump through the curing apparatus. If a single reservoir is used, and cooling is desired, a heat source and refrigeration apparatus must be incorporated into the reservoir. This allows the curing apparatus to be rapidly switched from heating to cooling. Preferably, two reservoirs are used, one heated and the other cooled, so that the curing apparatus can be switched quickly and efficiently from the heating to cooling.

By varying the temperature of the liquid heat transfer medium and/or the rate of its flow, the rate of heating can be precisely controlled. Should a variation in temperature be required, both the temperature of the liquid heat transfer medium and its flow rate can be increased or decreased independently, at a rate that meets the requirements of the material being cured.

Similarly, the curing apparatus and the cured object can be rapidly cooled after the curing process has been completed by using a cooled liquid heat transfer medium. The direct heating and cooling of the curing apparatus and the ability to rapidly change from a heating mode to a cooling mode provide for more efficient use of the apparatus, since the time required to cure an object, strip the cured object from the mandrel, and install the next item to be cured is significantly reduced when compared to the time required for the same procedure in a prior art system. In the preferred embodiment of the present invention, two separate reservoirs are utilized for the liquid heat transfer medium, where one of the reservoirs is heated and the other is cooled. Switching from the heated reservoir to the cooled reservoir allows the apparatus to be switched from the heating to the cooling mode, substantially reducing or essentially eliminating the time lag between modes, further improving the efficiency of the process.

As the pressure applied to the uncured object is independent of the temperature in the present invention, the pressure is precisely and accurately controlled in a manner that is not possible with live steam or wrapping. Pressure is preferably applied to the object by means of a flexible, expandable elastomeric bladder, which is expanded with either a pressurized gas or the liquid heat transfer medium. However, any means for providing substantially uniform pressure on the entire surface of the object to be cured may be utilized. Because the heat transfer medium is a liquid, its pressure is independent of the temperature. In the embodiment preferred for printing blankets, the pressure of the gas can be controlled by conventional means because the gas is not used as a heat source for curing, and, thus, the temperature of the gas is not critical. This also eliminates the need for wrapping the object. The precise control of the pressure provided by the invention ensures properly shaped products with a smooth surface and controlled porosity. The precise control of the temperature and pressure in the present invention, which can be computer controlled, if desired, for highly precise variations with time, to provide the highest quality and most consistent product.

The rapid cure rate, the ability to cool the curing apparatus, and the elimination of the need to wrap the product with tape all save production time and handling and production costs, and increase production efficiency, thus, decreasing the unit cost of the product.

The invention is particularly well suited to the production of cylindrical offset printing blankets, such as those used on the Heidelberg-Harris M3000 "Sunday" press, or for the curing or vulcanization of similar products. Other applications include, but are not limited to, the curing or vulcanization of timing belts, flexographic printing plates, and any heat-curable cylindrical polymeric or elastomeric object that requires precise control of the temperature and pressure.

Figure 2:
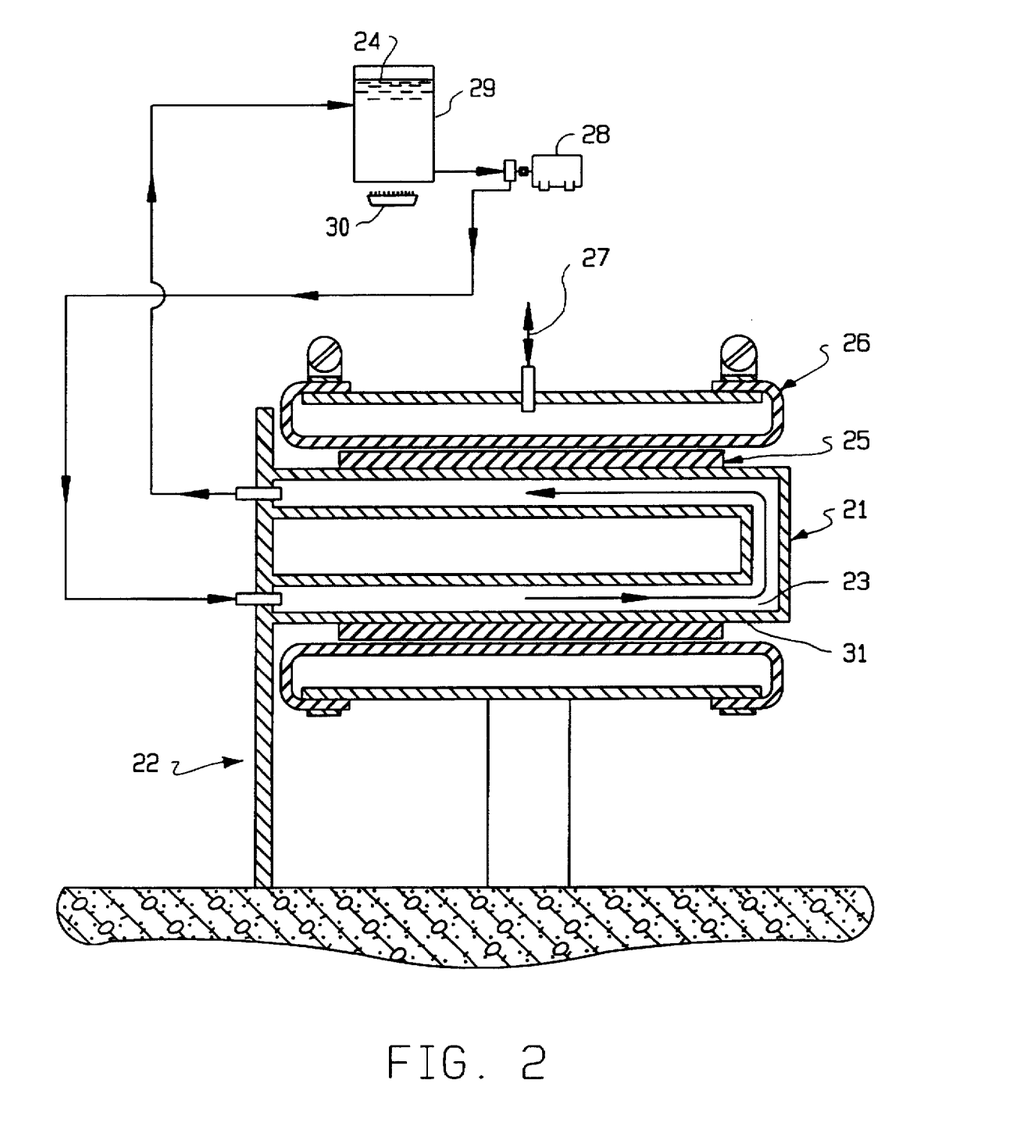
FIG. 2 depicts the preferred embodiment of the curing device of the present invention.

The embodiment best suited for the production of cylindrical printing blankets is shown in FIG. 2. A mandrel, 21, mounted on a base, 22, with at least one internal passage, 23, in the body of the mandrel, preferably near the outer surface, is used to heat and shape an object to be cured. The passage allows a liquid heat transfer medium, 24, to be pumped through the mandrel, 21, providing heat directly to the material and the object to be cured. The mandrel, 21, is cylindrical with an outer surface that is circular in cross section.

A cylinder of uncured rubber, 25, which may contain a variety of reinforcing components for the cylindrical printing blanket, as well as components that improve the compressibility of the blanket, is formed or placed on the outer surface of the mandrel, 21. An expandable bladder, 26, of an elastometic material is mounted coaxially with the mandrel, so that when the bladder, 26, is expanded, with a pressurized gas, 27, substantially uniform pressure is applied to the surface of the uncured rubber cylinder, 25.

During the curing process, a recirculating pump, 28, pumps a liquid heat transfer medium, 24, such as water, an oil, or a glycol, from a reservoir, 29, heated by a heat source, 30, through the passage in the mandrel, 21, and back to the reservoir, 29. Liquid heat transfer medium, 24, heats the mandrel, and cures the cylindrical printing blanket. The reservoir, 29, may also be provided with refrigeration equipment (not shown) to provide for the cooling of the curing apparatus, or a second cooled reservoir with a separate recirculating pump (not shown) may be utilized.

Typically, cylindrical printing blankets include layers of reinforced rubber that are built up on a thin metal or plastic sleeve. Heat delivery through the mandrel to the inside of the cylindrical printing blanket is preferred because the heat can be applied uniformly, and the temperature can be controlled with a high degree of precision. For cylindrical printing blankets that include a metal or plastic inner sleeve, the mandrel may be equipped with air holes or jets, 31, for distributing compressed air between the mandrel and the sleeve to allow the easy installation and removal of the cylindrical printing blankets.

Figure 3:
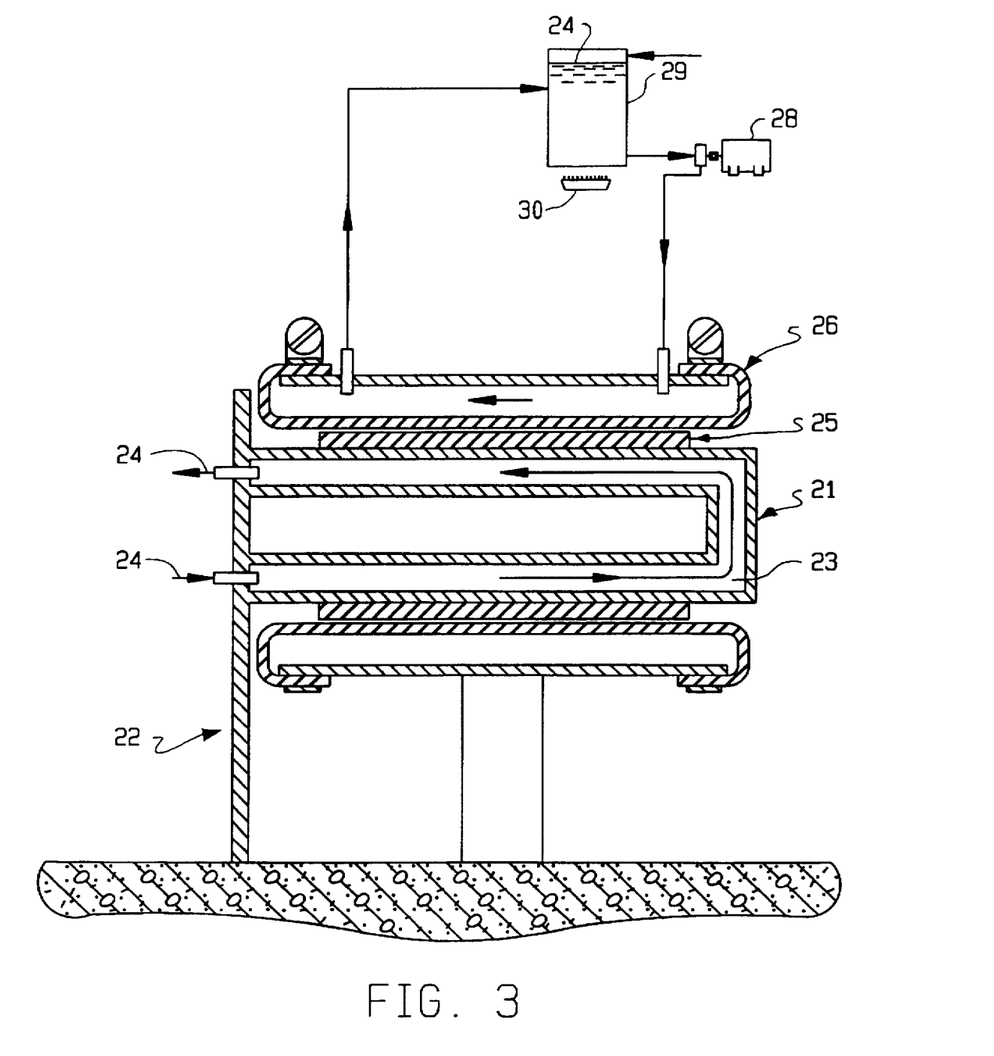
FIGS. 3 to 6 depict alternative embodiments of the curing device of the present invention.

Another embodiment of the invention calls for applying the curing heat to both the inner and outer surface of the uncured cylindrical polymeric object, which is preferred in some applications. This embodiment is illustrated in FIG. 3. As shown in FIG. 3, the liquid heat transfer medium, 24, is pumped through both the mandrel, 21, and the expandable elastomeric bladder, 26. The liquid heat transfer medium, 24, in the expandable elastomeric bladder, 26, is pressurized to supply the substantially uniform pressure to the surface of the uncured polymeric material, 25. Conventional means for controlling pressure are used with a recirculating pump, 28, to ensure precise control of the pressure in the expandable elastomeric bladder, 26. The liquid heat transfer medium, 24, supplied to the mandrel, 21, need not be under the same pressure as the expandable elastomeric bladder, 26, and is typically only under sufficient pressure to allow the liquid to flow through the mandrel at a rate that allows the precise control of the temperature.

Figure 4:
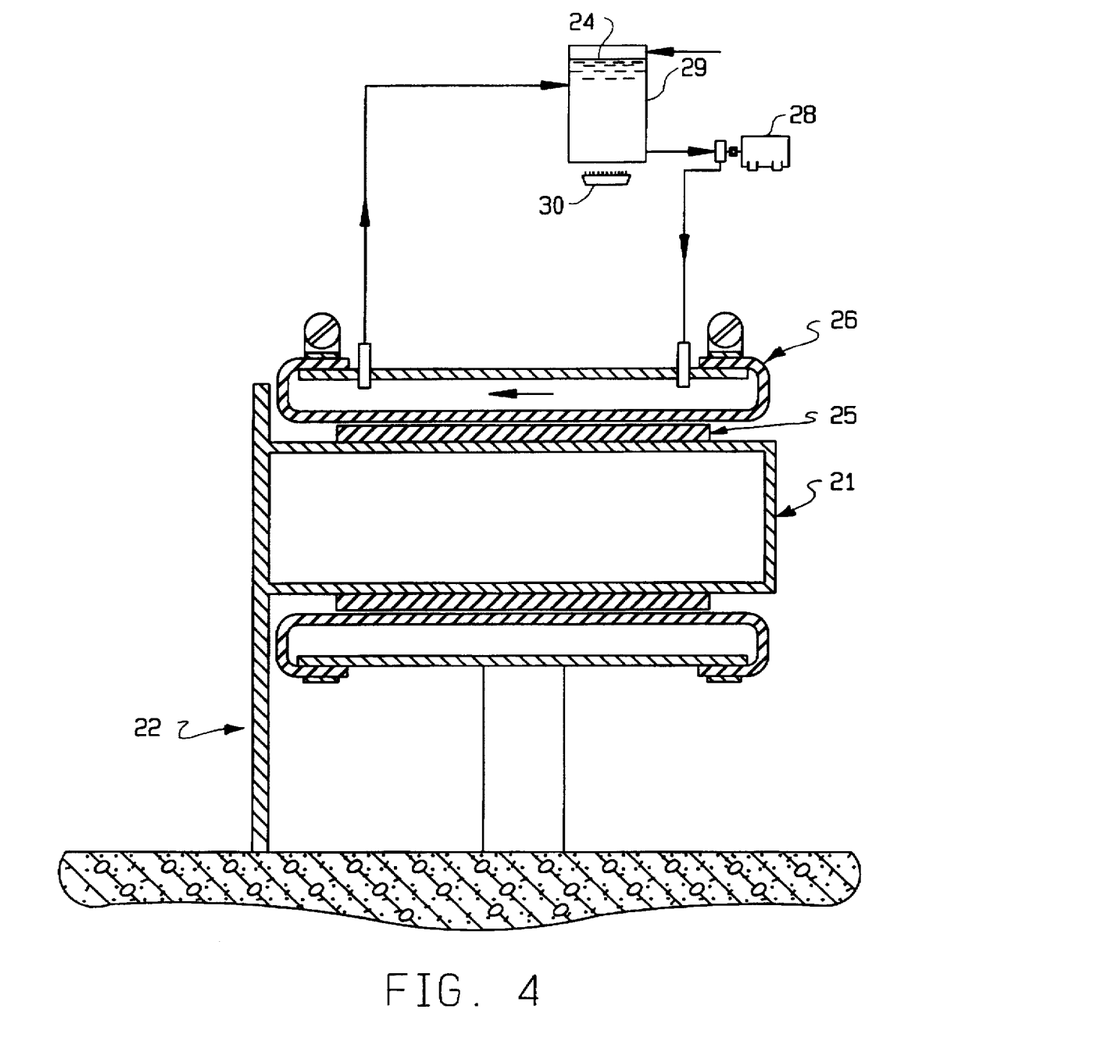

In a further embodiment of the invention, it is sometimes preferred to only supply heat to the outside of the material being cured. The apparatus for such an application is shown schematically in FIG. 4. Pressurized liquid heat transfer medium, 24, is only supplied to the expandable elastomeric bladder, 26, and the mandrel, 21, is not heated directly. Therefore, there is no need for a passage in the mandrel for the liquid heat transfer medium.

Figure 5:
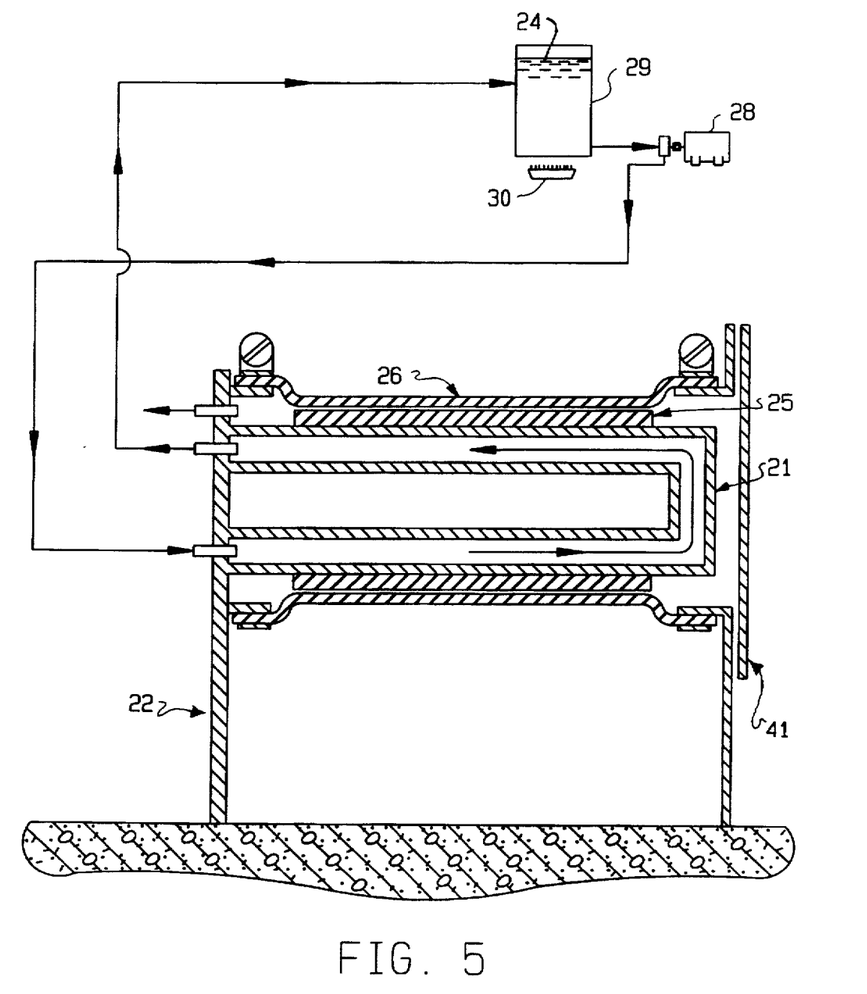

In certain other applications it is desirable to apply a vacuum between the expandable elastomeric bladder and the mandrel, as is shown in FIG. 5. In this device, the space between the mandrel, 21, and the expandable bladder, 26, is vacuum sealed with at least one seal plate, 41.

Figure 6:
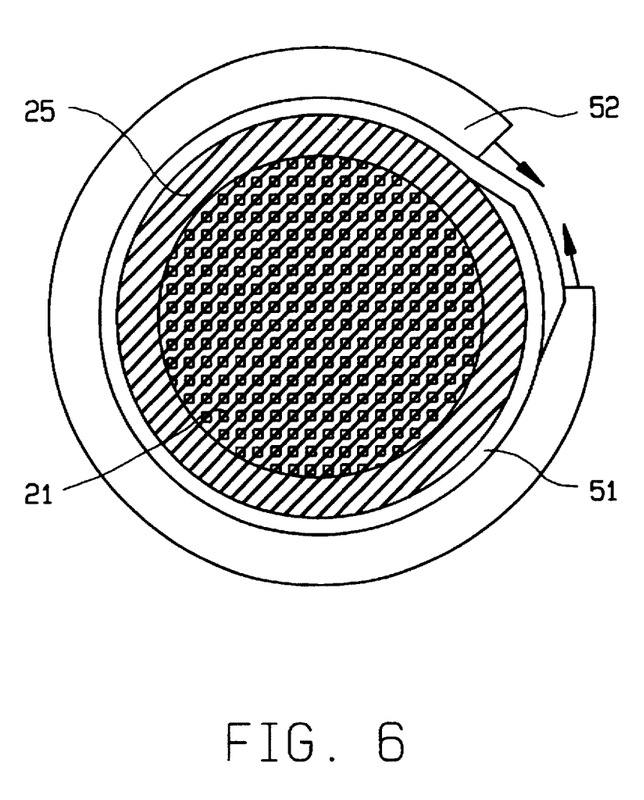

Substantially uniform pressure can also be applied to substantially all of the outer surface of the object by means other than an expandable elastomeric bladder. An example of such an alternative means is shown in FIG. 6. In this embodiment, the uncured polymeric cylinder, 25, is mounted around a heated mandrel, 21. An overlapping steel wrap, 51, is placed around the polymeric cylinder, 25, and is locked under tension with at least one extension spring, 52, or other tensioning device. The overlapping steel wrap, 51, ensures that pressure is applied substantially uniformly over substantially the entire surface of the polymeric cylinder, 25. The amount of pressure applied is controlled by the number of extension springs, 52 or other tensioning devices and the amount of pressure that can be applied by each extension spring, or other tensioning device.

In a typical cure cycle for a cylindrical printing blanket, the blanket is mounted or formed on a mandrel, and substantially uniform pressure is applied to the exterior surface of the object. Typically, the pressure ranges from about 5 to 25 psi, preferably about 10 to 20 psi, depending on the composition of the blanket. Although the curing apparatus will be at room temperature at the start of a production run, the temperature of the apparatus will typically be about 150° F. during the mounting and removal of the blanket when more than one blanket is manufactured on the curing apparatus during a production run. This allows uncured blankets to be installed, and cured blankets to be removed, with a minimum of protection equipment for the operator.

Once the blanket is mounted, the liquid heat transfer medium is pumped through the curing apparatus, which is heated to a temperature of about 330° F. over a period of about 3 to 12, and, preferably, about 6 to 8 minutes, during which the blanket may be at least partially cured. The temperature is then maintained for a period of about 3 to 15, and, preferably, about 6 to 10 minutes, known as the "soak period", during which the blanket is substantially cured. The apparatus and the object are then cooled to a temperature of about 150° F. in about 3 to 13, and, preferably, about 6 to 8 minutes. The curing may be completed during the cooling period. Once cooled, the blanket is ready for removal from the curing apparatus. Once the cured blanket is removed, the curing apparatus can be prepared for the next blanket to be cured. By following the present invention, a curing time of about one hour or less, and, preferably, about 20 to 40 minutes can be attained.

Objects other than cylindrical printing blankets can be cured in a similar manner on the apparatus of the invention. The actual pressures, temperature, and curing time used will depend on the nature and characteristics of the object that is cured. For example, the curing conditions will depend upon the size of the object, as well as the materials in the object, including any reinforcing materials used. Changes in curing conditions that may be required include a lower or higher curing temperature and a longer or shorter curing time. Typically, thicker objects will require a longer curing time, and the curing temperature will be dependent upon the material cured. One of ordinary skill in the art will readily be able to determine the curing requirements for any given object and material without any undue experimentation.

EXAMPLE

The scope of the invention is further described in connection with the following examples, which are set forth for purposes of illustration only, and which are not to be construed as limiting the scope of the invention in any manner.

Example 1

Figure 7:
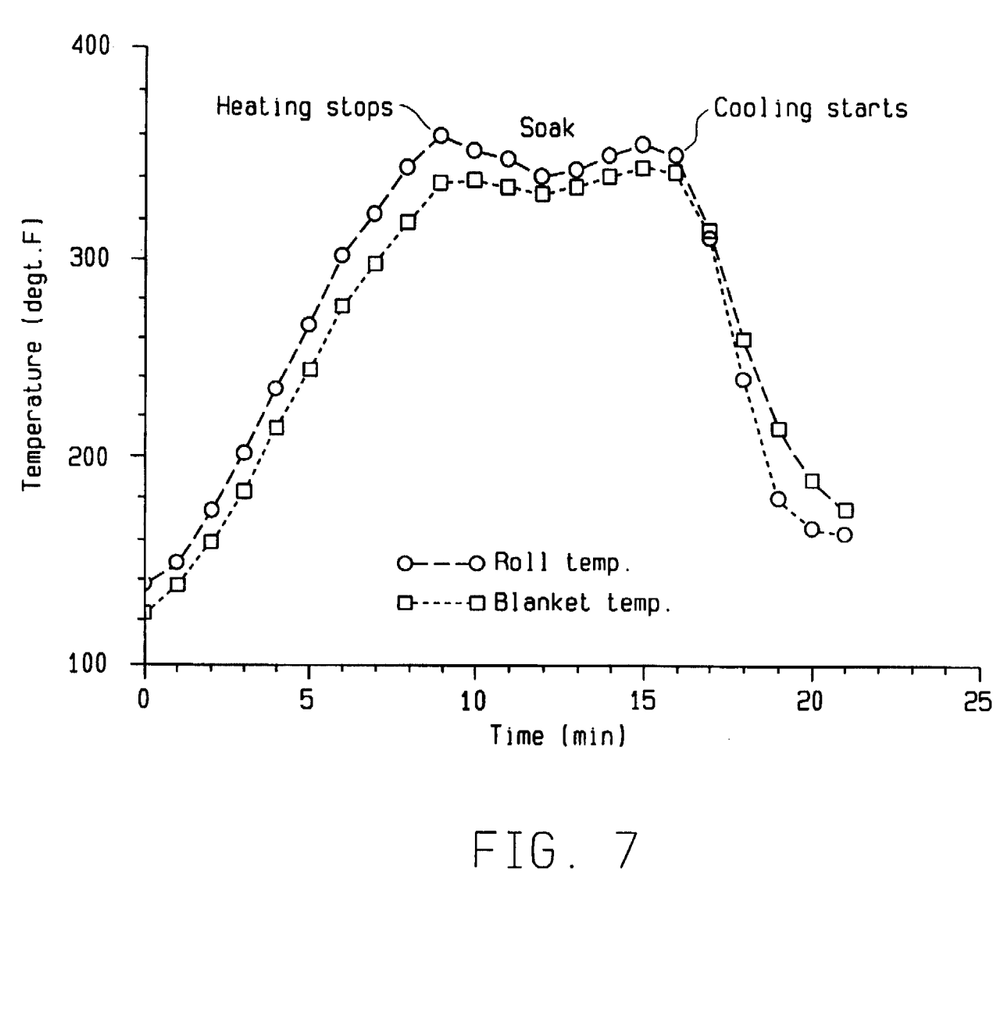
FIG. 7 is a temperature-time plot of a cylindrical printing blanket cure cycle in which the mandrel is heated and then cooled.

FIG. 7 provides a temperature-time plot of the cure cycle of a cylindrical printing blanket with the apparatus of the present invention. In this test run, the mandrel is at a temperature of about 140° F. when the blanket is mounted. As the mandrel is heated to a temperature of about 360° F. over a period of about 8 minutes, the temperature of the blanket increases at approximately the same rate, but at a temperature that is about 10° F. less than the mandrel at any given time. After about 8 minutes, the heating is stopped, and the temperature of the blanket is maintained at about 340° F. for about 8 minutes. The curing apparatus and the blanket are then cooled, and the fully cure blanket is removed from the curing apparatus, which has a temperature of about 160° F. The total cure cycle requires only 21 minutes, which is extremely short when compared to the several hours required by the prior art methods and apparatus.

Example 2

Figure 8:
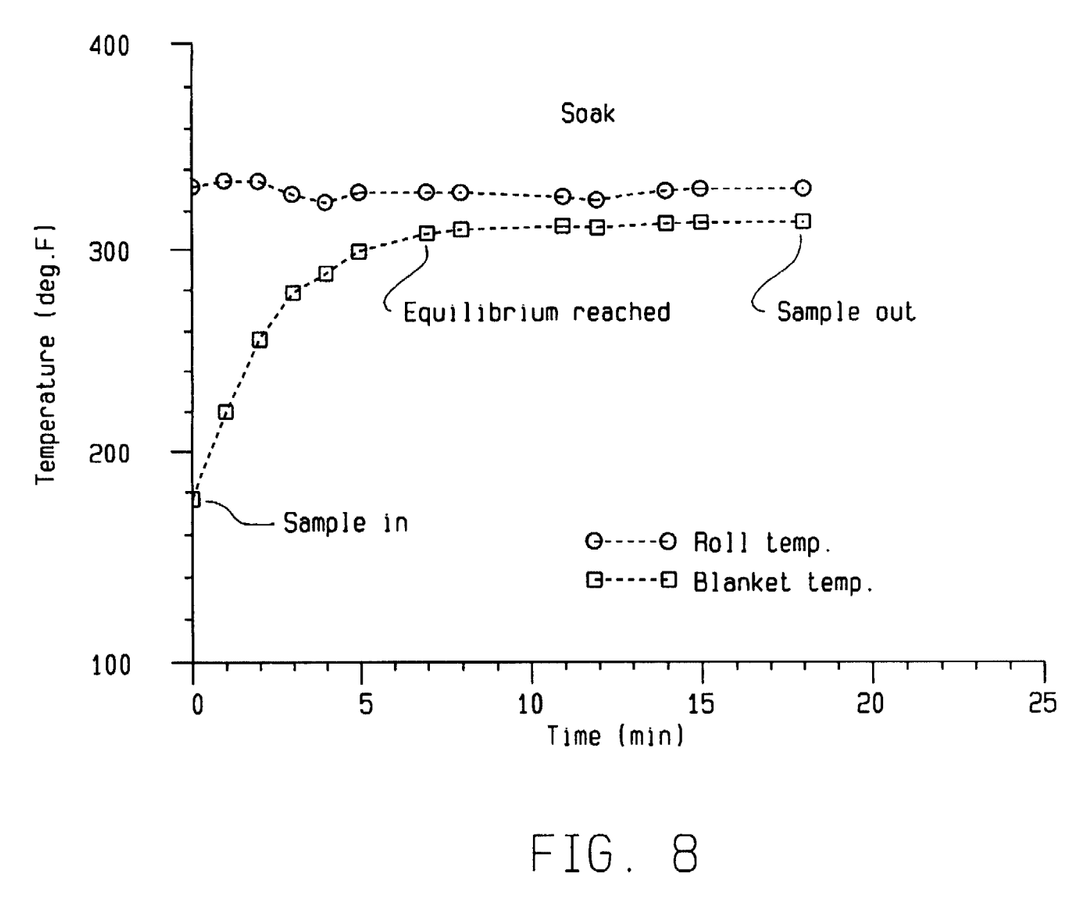
FIG. 8 is a temperature-time plot of a cylindrical printing blanket cure cycle in which the temperature of the mandrel is maintained at a constant temperature.

If the operator is properly protected from heat, the cooling mode of the cure cycle can be eliminated. Thus, the uncured object is mounted and the cured object is removed while the curing apparatus is at a temperature of over 300° C. This increases the efficiency of the apparatus significantly, and eliminates the need for refrigeration equipment for the liquid heat transfer medium. A temperature-time plot for such a curing cycle for a cylindrical printing blanket is shown in FIG. 8. In this test run, the temperature of the mandrel is maintained at about 330° F. After installation, the temperature of the object rises rapidly for about 7 to 8 minutes until an equilibrium temperature of about 310° F. is reached. After only 18 minutes, the fully cured blanket can be removed from the curing apparatus, where a period on the order of 8 hours is required with prior art methods and apparatus.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A method of curing an uncured cylindrical object at a controlled curing temperature, the method comprising:
   placing an uncured cylindrical object, having an inner surface and an outer surface, between an outer support, having a movable support surface, and an inner stationary support, having a stationary support surface so that the object is in coaxial orientation about the stationary support;
   expanding the outer support to move the movable support surface against the object and thereby press the object against the inner stationary support; and
   heating at least the stationary support with a heated liquid heat transfer medium by circulating the heated liquid through the inner stationary support to directly transfer heat to substantially all of the object to cure the object, said heated liquid being circulated at a controlled temperature and at a controlled flow rate to control the curing temperature and rate of heating.

2. The method of claim 1, further comprising expanding the outer support to move the movable support surface between a first position, wherein it is spaced from the object, to a second position, where it contacts and applies pressure to the object.

3. The method of claim 1, further comprising utilizing the heated heat transfer medium to expand the outer support, whereby contact between the movable support surface of the outer support and the object transfers heat to cure the object.

4. The method of claim 1, wherein a pressurized gas is passed into and out of the outer support to respectively expand and contract the support.

5. The method of claim 1, further comprising providing a vacuum in the space between the object and the movable support surface of the outer support to assist in moving the movable support surface into contact with the object.

6. The method of claim 1, wherein the stationary support surface is heated by heating the liquid heat transfer medium, and pumping the heated medium through at least one passage in the stationary inner support, whereby contact between the stationary support surface of the stationary inner support and the object transfers heat to cure the object.

7. The method of claim 1, wherein the movable support surface applies substantially uniform pressure to the outer surface of the object.

8. The method of claim 1, wherein the object is cured for about 1 hour or less.

9. The method of claim 1, wherein one of the support surfaces is cooled by contacting a cooled heat transfer medium after the heating step to facilitate removal of the cured object from the support surfaces.

10. The method of claim 9, wherein the object is cured in about 20 to 40 minutes utilizing a heating interval, a holding interval, and a cooling interval.

11. The method of claim 1, wherein the uncured object is supported and cured in an apparatus comprising:
    a cylindrical mandrel having an outer surface; and
    an expandable bladder, mounted coaxially around the outer surface of the mandrel, the bladder configured and adapted for applying substantially uniform pressure to the cylindrical object when positioned on the outer surface of the mandrel, with the inner surface of the bladder initially spaced from the outer surface of the mandrel.

12. The method of claim 11, further comprising at least one passage in the mandrel for circulation of the heat transfer medium, and a pump to circulate the liquid heat transfer medium through the passage.

13. The method of claim 11, further comprising reservoir means having at least two compartments for storing the liquid heat transfer medium, wherein at least one compartment is adapted for heating the liquid heat transfer medium, and at least one other compartment is adapted for cooling the liquid heat transfer medium.

14. The method of claim 11, wherein the bladder expands to apply pressure on the object by receiving the liquid heat transfer medium, which is circulated into and out of the bladder to respectively expand and contract the bladder.

15. The method of claim 11, wherein the bladder expands to apply pressure to the object by receiving a pressurized gas, which is admitted into and out of the bladder to respectively expand and contract the bladder.

16. The method of claim 11, further comprising at least one vacuum seal adapted to seal the space between the mandrel and the expandable bladder, and means for producing a vacuum in the space between the mandrel and the expandable bladder to assure contact of the inner surface of the bladder with the object.

17. The method of claim 11, further comprising at least one gas jet in the mandrel, adapted to direct a flow of gas between the mandrel and the cylindrical object to expand the cylindrical object to facilitate installation and removal thereof, and means for providing pressurized gas to the at least one gas jet.

18. The method of claim 1, further comprising applying a substantially uniform pressure to the outer surface of the object with the movable support surface, wherein the applied pressure is independent of the curing temperature.

19. The method of claim 1, further comprising directing a flow of gas between the cylindrical object and the stationary support to facilitate installation and removal of the object.

* * * * *